United States Patent
Kim et al.

(10) Patent No.: US 8,509,430 B2
(45) Date of Patent: Aug. 13, 2013

(54) STORAGE DEVICES HAVING A SECURITY FUNCTION AND METHODS OF SECURING DATA STORED IN THE STORAGE DEVICE

(75) Inventors: Ho-jung Kim, Suwon-si (KR); In-kyeong Yoo, Yongin-si (KR); Jai-kwang Shin, Anyang-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 350 days.

(21) Appl. No.: 12/923,375

(22) Filed: Sep. 17, 2010

(65) Prior Publication Data
US 2011/0222685 A1    Sep. 15, 2011

(30) Foreign Application Priority Data
Mar. 15, 2010   (KR) .................. 10-2010-0022959

(51) Int. Cl.
*H04L 29/06*    (2006.01)

(52) U.S. Cl.
USPC .......................................... 380/44

(58) Field of Classification Search
USPC .......................................... 380/44
See application file for complete search history.

(56) References Cited

U.S. PATENT DOCUMENTS

| | | | |
|---|---|---|---|
| 6,405,315 B1 * | 6/2002 | Burns et al. | 713/190 |
| 6,711,690 B2 | 3/2004 | Dayan et al. | |
| 6,971,016 B1 * | 11/2005 | Barnett | 713/182 |
| 8,199,911 B1 * | 6/2012 | Tsaur et al. | 380/44 |
| 2002/0143888 A1 * | 10/2002 | Lisiecki et al. | 709/214 |
| 2003/0056070 A1 | 3/2003 | Dayan et al. | |
| 2003/0084290 A1 * | 5/2003 | Murty et al. | 713/168 |
| 2005/0138404 A1 * | 6/2005 | Weik et al. | 713/193 |
| 2008/0002830 A1 * | 1/2008 | Cherkasov et al. | 380/277 |
| 2009/0217058 A1 | 8/2009 | Obereiner et al. | |
| 2009/0300312 A1 | 12/2009 | Handschuh et al. | |

FOREIGN PATENT DOCUMENTS

| | | |
|---|---|---|
| JP | 2009-176147 A | 8/2009 |
| KR | 10-2005-0084339 A | 8/2005 |
| KR | 10-0874872 B1 | 12/2008 |
| KR | 10-2009-0067649 A | 6/2009 |

\* cited by examiner

*Primary Examiner* — Michael S McNally
(74) *Attorney, Agent, or Firm* — Harness, Dickey & Pierce, P.L.C.

(57) ABSTRACT

A storage device may include a storage unit that stores data transmitted via a plurality of first wires; and a security control unit that controls connection between each of a plurality of second wires connected to an external device and each of the plurality of first wires by programming a plurality of switching devices according to an encryption key.

25 Claims, 6 Drawing Sheets

STORAGE DEVICES HAVING A SECURITY FUNCTION AND METHODS OF SECURING DATA STORED IN THE STORAGE DEVICE

CROSS-REFERENCE TO RELATED APPLICATIONS

This application claims priority under 35 U.S.C. §119 to Korean Patent Application No. 10-2010-0022959, filed on Mar. 15, 2010, in the Korean Intellectual Property Office (KIPO), the disclosure of which is incorporated herein in its entirety by reference.

BACKGROUND

1. Field

Example embodiments relate to storage devices, and particularly to a storage device having a security function and a method of securing the storage device.

2. Description of the Related Art

Examples of a storage device that stores data include, for example, a magnetic disk, an optical disk, a semiconductor memory, and the like. Various security programs have been developed to protect data stored in these storage devices. However, these security programs are expensive and a configuration of a storage device using these security program(s) may be complex and usage of such security program(s) may lead to degradation in a performance of the storage devices.

SUMMARY

According to example embodiments, a storage device includes a storage unit configured to store data transmitted via a plurality of first wires; and a security control unit configured to control a connection between each of a plurality of second wires connected to an external device and each of the plurality of first wires by programming a plurality of switching devices according to an encryption key.

According to example embodiments, the security control unit connects the plurality of first wires to the plurality of second wires in a one-to-one correspondence by controlling a routing between the plurality of first and second wires based on the programmed plurality of switching devices.

According to example embodiments, the security control unit further includes a key stream generation unit configured to receive the encryption key and generate a key stream; and a wiring connection control unit configured to program the plurality of switching devices according to the generated key stream so as to control the connection between each of the plurality of second wires and each of the plurality of first wires.

According to example embodiments, the security control unit further includes a wiring connection unit, the wiring connection unit including the plurality of first wires; the plurality of second wires; and the plurality of switching devices at intersections of the plurality of first wires and the plurality of second wires, the plurality of switching devices configured to connect each of the plurality of second wires and each of the plurality of first wires according to a result of the programming performed by the wiring connection control unit.

According to example embodiments, the plurality of switching devices includes resistive memory devices or flash memory devices.

According to example embodiments, the plurality of switching devices includes resistive memory devices, and a difference between a resistance of each of the resistive memory devices when programmed to a first logic state and a resistance of each of the resistive memory devices when programmed to a second logic state is greater than a desired resistance.

According to example embodiments, the security control unit further includes a wiring connection unit, the wiring connection unit including the plurality of first wires; the plurality of second wires; and the plurality of switching devices that are at intersections of the plurality of first wires and the plurality of second wires, wherein each of the plurality of switching device includes a switch; and a switch control unit that includes at least one non-volatile memory device that is programmed by the wiring connection control unit, and that controls the switch to be turned on/off.

According to example embodiments, the switch control unit further includes a latch that reads and stores a logic value programmed in the at least one non-volatile memory device.

According to example embodiments, the switch control unit further includes a latch that reads and stores a logic value programmed in at least two non-volatile memory devices that are complementarily programmed according to the encryption key.

According to example embodiments, the latch includes a first inverter including a first pull-up transistor connected to a power supply voltage terminal and a first pull-down transistor serially connected to the first pull-up transistor; a second inverter including a second pull-up transistor connected to the power supply voltage terminal and a second pull-down transistor serially connected to the second pull-up transistor, the second inverter being cross-coupled with the first inverter; and an equalization unit that connects a gate of the first pull-down transistor to a gate of the second pull-down transistor according to an equalization signal.

According to example embodiments, the equalization unit includes a transistor that is turned on when the equalization signal is activated, to connect a gate of the first pull-down transistor to a gate of the second pull-down transistor.

According to example embodiments, the at least two non-volatile memory devices include a first non-volatile memory device connected between a source of the first pull-down transistor and a ground voltage terminal; and a second non-volatile memory device connected between a source of the second pull-down transistor and the ground voltage terminal.

According to example embodiments, the at least one non-volatile memory device includes a resistive memory device, a magnetic memory device, or a flash memory device.

According to example embodiments, the security control unit converts data input from the external device into secured data and provides the secured data to the storage unit, and converts the secured data stored in the storage unit to data which is provided to the external device, the conversion being performed by controlling the connection between each of the plurality of second wires and each of the plurality of first wires according to the encryption key.

According to example embodiments, the security control unit decrypts encrypted data input from the external device and provides the decrypted data to the storage unit, and encrypts the decrypted data stored in the storage unit and provides the encrypted data to the external device, the encryption and decryption being performed by controlling the connection between each of the plurality of second wires and each of the plurality of first wires according to the encryption key.

According to example embodiments, the plurality of first wires and the plurality of second wires are in a matrix shape.

According to example embodiments, an electronic device includes the storage device according to example embodiments; and a processor configured to access the storage device.

According to example embodiments, the storage device is at least one selected from the group consisting of a magnetic storage medium, an optical storage medium, a semiconductor storage medium and a combination thereof.

According to example embodiments, a storage server includes the storage device according to example embodiments; and a server configured to provide data from the storage device via a network or stores data to the storage device via the network, the data being provided and stored according to a client request.

According to example embodiments, a network storage includes the storage device according to example embodiments; and a network interface configured to connect the storage device to at least one user via a network.

According to example embodiments, a method of securing data stored in a storage device, the storage device including a storage unit configured to store data and a security control unit configured to secure the data, includes: programming a plurality of non-volatile memory devices included in the security control unit according to an encryption key of the storage device; and controlling a connection between each of a plurality of first wires connected to the storage unit and each of a plurality of second wires connected to an external device, according to a result of the programming of each of the plurality of non-volatile memory devices.

According to example embodiments, the method further includes receiving the encryption key to generate a key stream, wherein programming the plurality of non-volatile memory devices includes performing a program operation on each of the plurality of non-volatile memory devices according to the generated key stream.

According to example embodiments, controlling the connection between each of the plurality of second wires and each of the plurality of first wires includes connecting the plurality of first wires to the plurality of second wires in a one-to-one correspondence according to a result of the programming of each of the plurality of non-volatile memory devices.

According to example embodiments, when the encryption key is modified, the method further includes programming each of the plurality of non-volatile memory devices according to the modified encryption key, wherein controlling the connection between each of the plurality of first wires and the plurality of second wires includes changing the connection between each of the plurality of second wires and each of the plurality of first wires according to a result of the programming of the plurality of non-volatile memory devices according to the modified encryption key.

According to example embodiments, the method further includes transmitting the data to the storage unit or the external device according to the connection between each of the plurality of first wires and the plurality of second wires.

BRIEF DESCRIPTION OF THE DRAWINGS

The above and other features and advantages will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
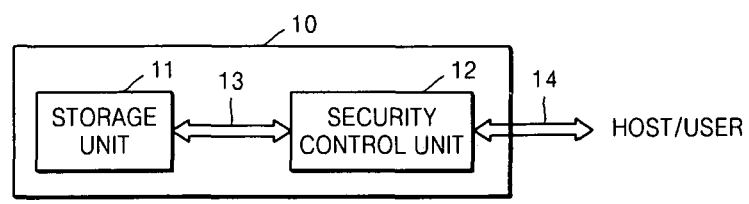
FIG. 1 is a block diagram of a storage device according to example embodiments.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a block diagram of a storage device 10 according to example embodiments.

Referring to FIG. 1, the storage device 10 may include a storage unit 11 and a security control unit 12, and the storage unit 11 may be connected to the security control unit 12 via an internal data bus 13. The storage device 10 may be connected to an external device such as a host and/or a user via an external data interface 14 and thus may provide data stored in the storage unit 11 to the external host device and/or the user or may store data received from the external host device and/or the user in the storage unit 11. The host may include any terminal capable of accessing data stored in the storage device 10, such as, a personal computer (PC), a work station, a desktop computer, a laptop computer, a personal digital assistant (PDA), or the like.

According to example embodiments, the storage device 10 may be a main memory, a universal serial bus (USB) flash drive, an external hard drive, a solid state drive (SSD), a smart media (SM) card, a memory stick, a secure digital (SD) card, a multi-media card (MMC), a compact flash (CF) card, an MS card, an xD-Picture card, a storage, or the like. However, the storage device 10 is not limited thereto.

The storage unit 11 may store instructions and/or data. For example, the storage unit 11 may store media contents such as book data, image data, and/or audio data. The storage unit 11 may include a large-capacity storage unit such as a magnetic storage medium (for example, a floppy disk or a hard disk drive (HDD)), an optical storage medium (for example, a laser disk, a compact disk, a magneto-optical disk, an Mini-Disc (MD), a compact disk-read only memory (CD-ROM), a digital versatile disc (DVD), or a blue-ray disk), or a semiconductor storage medium (for example, a volatile memory such as a dynamic random access memory (DRAM) or a static RAM (SRAM) or a nonvolatile memory such as a flash memory, a magnetic RAM (MRAM), a resistive RAM (RRAM), a phase change RAM (PRAM), a nano floating gate memory (NFGM), a polymer RAM (PoRAM), a Ferroelectric RAM (FeRAM), an electrically erasable programmable read only memory (EEPROM), or the like).

The security control unit 12 may control routing of data between a plurality of internal wires connected to the storage unit 11 via the internal data bus 13 and a plurality of external wires connected to the external device, such as a host and/or a user, via the external data interface 14, thereby providing a function of securing the data stored in the storage unit 11. The security control unit 12 may include a plurality of non-volatile memory devices that are programmed according to an encryption key. Each of the plurality of non-volatile memory devices may operate as a switch according to a result of the programming. For example, a non-volatile memory device programmed to '1' may correspond to an "ON" state, and a non-volatile memory device programmed to '0' may correspond to an "OFF" state.

The security control unit 12 may be implemented by using a reconfigurable logic device which includes a plurality of non-volatile memory devices and the functioning of the security control unit 12 may depend on a programming of the plurality of non-volatile memory devices. Accordingly, the routing between the plurality of internal wires and the plurality of external wires may be changed according to the encryption key. Since the security control unit 12 may change the routing between the plurality of internal wires and the plurality of external wires according to the encryption key, data input from the external device (for example, unencrypted data) may be converted into secured data (for example, encrypted data) and the secured data may be stored in the storage unit 11. When an authorized user, namely, a user having an authorized encryption key, accesses the storage device 10, the routing between the plurality of internal wires and the plurality of external wires may be changed according to the encryption key, and secured data stored in the storage unit 11 may be changed (for example, decrypted) into data originally input from the external device and the original data may be provided to the user. In this case, since the storage unit 11 of the storage device 10 stores the secured data (for example, encrypted data), when an unauthorized user, namely, a user having no encryption keys, accesses the storage device 10, the original data (for example, unencrypted data) may not be acquired.

Figure 2:
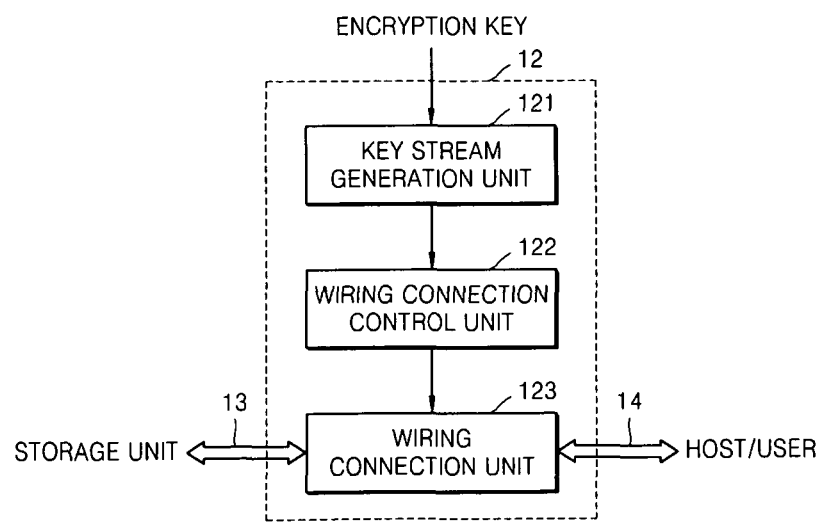
FIG. 2 is a block diagram of a security control unit included in the storage device illustrated in FIG. 1.

FIG. 2 is a block diagram of the security control unit 12 included in the storage device 10 of FIG. 1.

Referring to FIG. 2, the security control unit 12 may include a key stream generation unit 121, a wiring connection control unit 122, and/or a wiring connection unit 123. Components of the security control unit 12 will now be described in greater detail.

The key stream generation unit 121 may receive an encryption key provided to the storage device 10 and generate a key stream based on the encryption key. When the encryption key provided to the storage device 10 is changed, the key stream generation unit 121 may generate another key stream. For example, the key stream generation unit 121 may generate a key stream by using a hash function. However, a function used to generate a key stream is not limited to the hash function, and various encryption functions and/or algorithms may be used. In addition, a generated key stream may not be fixed but may be periodically updated, thereby providing a high-level security function.

The wiring connection control unit 122 may program each (or at least a portion) of the plurality of non-volatile memory devices to '1' or '0' according to the key stream generated by the key stream generation unit 121. When the encryption key provided to the storage device 10 is changed, the wiring connection control unit 122 may reprogram each (or at least a portion) of the plurality of non-volatile memory devices. Accordingly, when multiple users access the storage device 10 using different encryption keys, regions of the storage unit 11 that can be accessed by the respective users may be different, and/or acquirable data items may be different for different users even when the same region is accessed by the users. The wiring connection control unit 122 may periodically program all (or at least a portion) of the plurality of non-volatile memory devices to '1' or '0' or erase data from all (or at least a portion) of the plurality of non-volatile memory devices, thereby reinforcing and/or increasing the security of data stored in the storage device 10.

The wiring connection unit 123 may include the plurality of non-volatile memory devices and connect the plurality of internal wires to the plurality of external wires in a one-to-one correspondence according to a result of the programming of the plurality of non-volatile memory devices by the wiring connection control unit 122. A structure of the wiring connection unit 123 will now be described with reference to FIG. 3.

According to example embodiments, the security control unit 12 may further include an encryption unit (not shown). The encryption unit may be disposed between the wiring connection unit 123 and the internal data bus 13 and/or between the wiring connection unit 123 and the external data interface 14. When the encryption unit is disposed between the wiring connection unit 123 and the internal data bus 13, the encryption unit may provide the storage unit 11 encrypted data obtained by encrypting data provided by the wiring connection unit 123 according to an encryption algorithm, thereby reinforcing and/or increasing the security of the data that is input to the storage device 10. When the encryption unit is disposed between the wiring connection unit 123 and the external data interface 14, the encryption unit may provide a host and/or a user encrypted data obtained by encrypting data provided by the wiring connection unit 123 according to an encryption algorithm, thereby reinforcing and/or increasing the security of the data output from the storage device 10.

Figure 3:
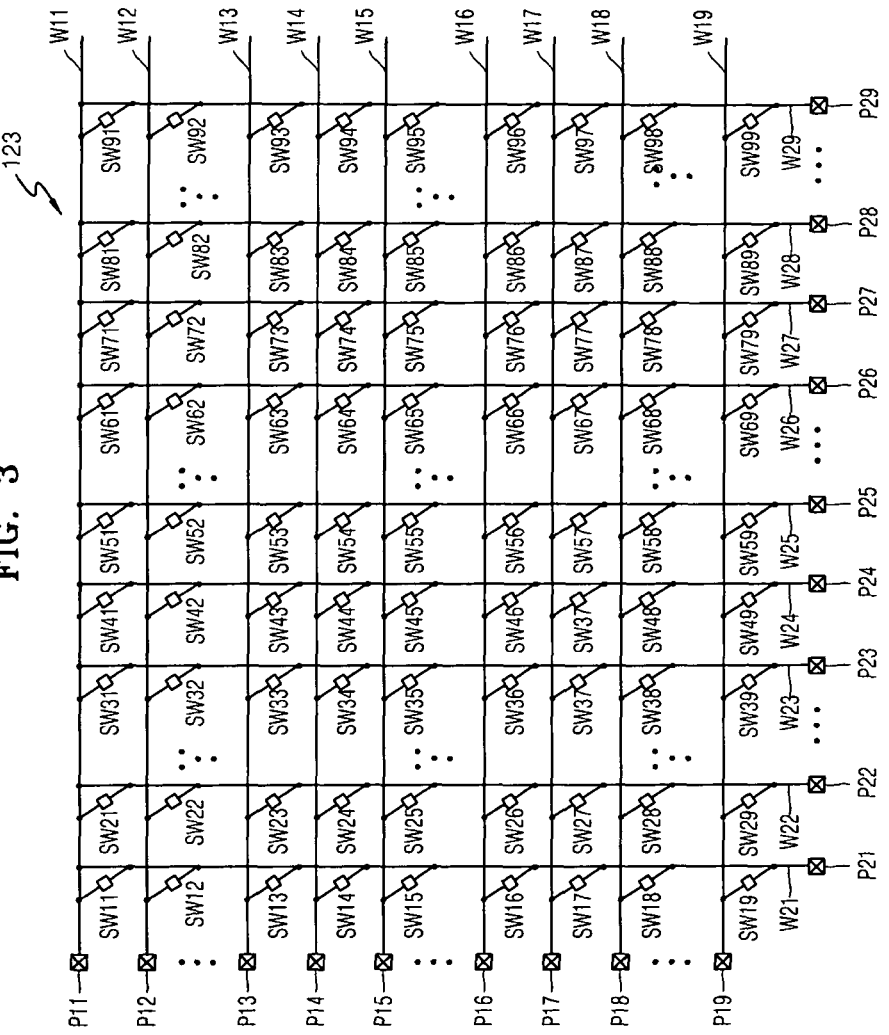
FIG. 3 is a circuit diagram of a wiring connection unit included in the security control unit illustrated in FIG. 2.

FIG. 3 is a circuit diagram of the wiring connection unit 123 included in the security control unit 12 illustrated in FIG. 2.

Referring to FIG. 3, the wiring connection unit 123 may include a plurality of internal wires W11 through W19, a plurality of external wires W21 through W29, and a plurality of switching units SW11 through SW99. Although FIG. 3 illustrates nine internal wires and nine external wires for convenience of explanation, the number of internal wires and the number of external wires is not limited thereto and may vary as required.

The plurality of internal wires W11 through W19 are connected to internal data pads P11 through P19, respectively, and the internal data pads P11 through P19 are connected to the internal data bus 13. The plurality of external wires W21 through W29 are connected to external data pads P21 through P29, respectively, and the external data pads P21 through P29 are connected to the external data interface 14. According to example embodiments, the plurality of internal wires W11 through W19 and the plurality of external wires W21 through W29 may be arranged in a matrix shape, but the arrangement between the plurality of internal wires W11 through W19 and the plurality of external wires W21 through W29 is not limited thereto.

The plurality of switching units SW11 through SW99 are disposed at intersections between the plurality of internal wires W11 through W19 and the plurality of external wires W21 through W29. Each of the plurality of switching units SW11 through SW99 includes at least one non-volatile memory device that may be programmed (for example, '1' or '0') by the wiring connection control unit 122 to be turned on/off. Thus, the plurality of internal wires W11 through W19 may be connected to the plurality of external wires W21 through W29 in a one-to-one correspondence. For example, when one of the switching units SW11 through SW19 connected to the first external wire W21 is turned on, and the others are turned off, the first external wire W21 is connected to one of the internal wires W11 through W19 connected to the turned-on switching unit.

For example, nine switching units SW13, SW25, SW37, SW49, SW51, SW62, SW74, SW86, and SW98 from among the plurality of switching units SW11 through SW99 are turned on, and the others are turned off. Since the switching unit SW13, which is the third of the plurality of switching units connected to the first external wire W21, is turned on, the first external wire W21 is connected to the third internal wire W13. Since the switching unit SW25, which is the fifth of the plurality of switching units connected to the second external wire W22, is turned on, the second external wire W22 is connected to the fifth internal wire W15. Since the switching unit SW37, which is the seventh of the plurality of switching units connected to the third external wire W23, is turned on, the third external wire W23 is connected to the seventh internal wire W17. Since the switching unit SW49, which is the ninth of the plurality of switching units connected to the fourth external wire W24, is turned on, the fourth external wire W24 is connected to the ninth internal wire W19. Since the switching unit SW51, which is the first of the plurality of switching units connected to the fifth external wire W25, is turned on, the fifth external wire W25 is connected to the first internal wire W11. Since the switching unit SW62, which is the second of the plurality of switching units connected to the sixth external wire W26, is turned on, the sixth external wire W26 is connected to the second internal wire W12. Since the switching unit SW74, which is the fourth of the plurality of switching units connected to the seventh external wire W27, is turned on, the seventh external wire W27 is connected to the fourth internal wire W14. Since the switching unit SW86, which is the sixth of the plurality of switching units connected to the eighth external wire W28, is turned on, the eighth external wire W28 is connected to the sixth internal wire W16. Since the switching unit SW98, which is the eighth of the plurality of switching units connected to the ninth external wire W29, is turned on, the ninth external wire W29 is connected to the eighth internal wire W18. Accordingly, when data items of a, b, c, d, e, f, g, h, and i are sequentially input to the first through ninth external data pads P21 through P29, data items of e, f, a, g, b, h, c, i, and d are sequentially output to the first through ninth internal data pads P11 through P19.

As such, according to example embodiments, when original data (for example, abcdefghi) is input by a host and/or a user, the security control unit 12 programs the plurality of non-volatile memory devices according to an encryption key so as to control the on/off operation of the plurality of switching units, thereby providing secured data (for example, efagbhcid) to the storage unit 11. Thus, even when an unauthorized user accesses the storage device 10, since secured data (for example, encrypted data) is stored in the storage unit 11, the unauthorized user may not acquire original data.

According to example embodiments, data security is provided by changing routing between an external device and the storage device 10 without needing to use a special encryption program, so that data may be encrypted or decrypted in real time.

When a user wants to read data from the storage unit 11, the user may change secured data stored in the storage unit 11 back into original data in order to read the original data from the storage unit 11, by controlling the routing between the plurality of internal wires and the plurality of external wires by using the same encryption key as that used to store the secured data in the storage unit 11.

When several users use the storage device 10, since each of the users may have different encryption keys, each of the users may control the routing between the plurality of internal wires and the plurality of external wires by using a corresponding encryption key. Accordingly, even when several users access the same storage device 10, the users may obtain different data items from the storage unit 11.

Figure 4:
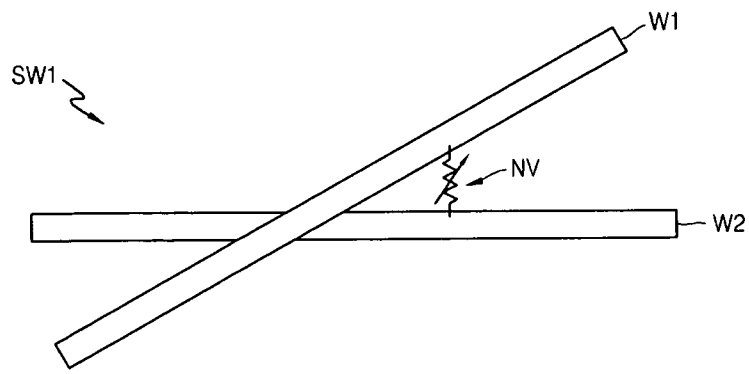
FIG. 4 is a circuit diagram of a switching unit included in the wiring connection unit illustrated in FIG. 3, according to example embodiments.

FIG. 4 is a circuit diagram of a switching unit SW1 included in the wiring connection unit 123 illustrated in FIG. 3, according to example embodiments. However, FIG. 4 is merely illustrative and a structure of the switching unit SW1 is not limited to the structure illustrated in FIG. 4.

Referring to FIG. 4, the switching unit SW1 may include a non-volatile memory device NV arranged at an intersection of an internal wire W1 and an external wire W2. The internal wire W1 is one of wires connected to the storage unit 11, and the external wire W2 is one of wires connected to the external device. For example, the non-volatile memory device NV may be a resistive memory device or a flash memory device. A case where the non-volatile memory device NV is a resistive memory device will now be described, but the non-volatile memory device NV is not limited to this case.

When the non-volatile memory device NV is programmed to represent a first logic level, for example, '1', the non-volatile memory device NV corresponds to a low resistance state. Thus, current may flow between the internal wire W1 and the external wire W2, and thus the internal wire W1 and the external wire W2 are connected to each other. When the non-volatile memory device NV is programmed to represent a second logic level, for example, '0', the non-volatile memory device NV corresponds to a high resistance state. Accordingly, current does not flow between the internal wire W1 and the external wire W2, and thus the internal wire W1 is not connected to the external wire W2.

In this case, in order to control connection between the internal wire W1 and the external wire W2 by using the non-volatile memory device NV with relative ease, the non-volatile memory device NV may be formed of a resistive material having a relatively large difference between its resistance when the non-volatile memory device NV is programmed to '1', that is, is in a low resistance state, and its resistance when the non-volatile memory device NV is programmed to '0', that is, is in a high resistance state.

According to example embodiments, since the security control unit 12 includes the non-volatile memory device NV arranged at the intersection of the internal wire W1 and the external wire W2, and the non-volatile memory device NV is programmed to '1' or '0', the connection between the internal wire W1 and the external wire W2 may be controlled. As such, since the connection between the internal wire W1 and the external wire W2 may be controlled by arranging only the non-volatile memory device NV between the internal wire W1 and the external wire W2, the security control unit 12 may have a relatively simple structure may occupy a relatively small area, thereby increasing area efficiency of the storage device.

Figure 5:
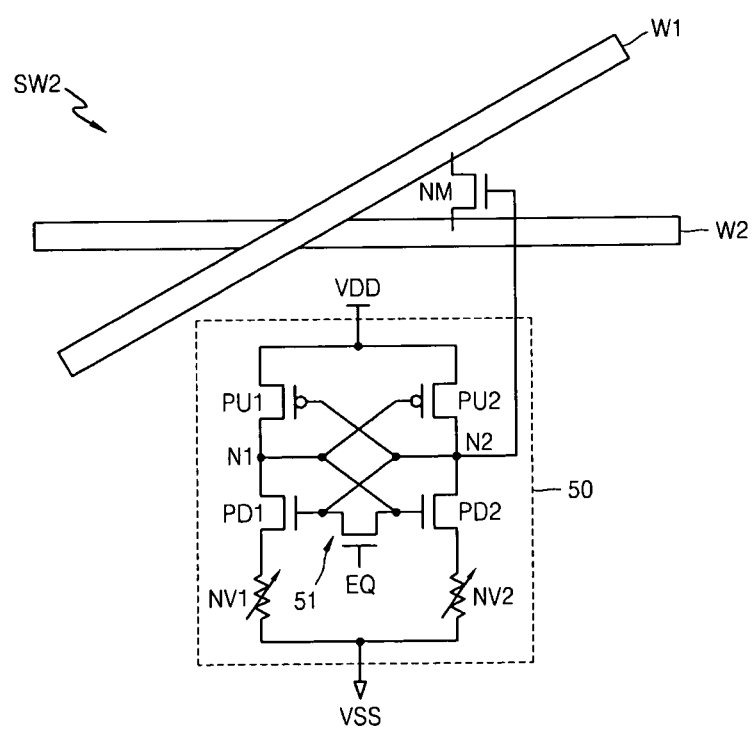
FIG. 5 is a circuit diagram of a switching unit included in the wiring connection unit illustrated in FIG. 3, according example embodiments.

FIG. 5 is a circuit diagram of a switching unit SW2 included in the wiring connection unit 123 illustrated in FIG. 3, according to example embodiments. However, FIG. 5 is merely illustrative and example embodiments are not limited thereto.

Referring to FIG. 5, the switching unit SW2 may include a switch NM and a switch control unit 50 that are arranged at an intersection between the internal wire W1 and the external wire W2. The internal wire W1 is one of the wires connected to the storage unit 11, and the external wire W2 is one of the wires connected to the external device. According to example embodiments, the switch NM may be an NMOS transistor. A source and a drain of the NMOS transistor may be connected to the internal wire W1 and the external wire W2, respectively. However, the structure of the switch NM is not limited thereto, and the switch NM may be implemented in a variety of different configuration as required by, for example, design.

The switch control unit 50 may be connected to the switch NM and control the on/off operation of the switch NM. The switch control unit 50 may include at least one non-volatile memory device that is programmed by the wiring connection control unit 122, and control the on/off operation of the switch NM is according to a result of the programming of the at least one non-volatile memory device. According to example embodiments, the switch control unit 50 may include first and second pull-up elements PU1 and PU2, first and second pull-down elements PD1 and PD2, an equalization unit 51, and first and second non-volatile memory devices NV1 and NV2.

The first pull-up element PU1 may be a PMOS transistor that has a source connected to a power supply voltage terminal VDD, a drain connected to a first node N1, and a gate connected to a second node N2. The first pull-down element PD1 may an NMOS transistor that has a drain connected to the first node N1 and a gate connected to the second node N2. The first pull-up element PU1 and the first pull-down element PD1 may constitute a first inverter.

The second pull-up element PU2 may be a PMOS transistor that has a source connected to the power supply voltage terminal VDD, a drain connected to the second node N2, and a gate connected to the first node N1. The second pull-down element PD2 may be an NMOS transistor that has a drain connected to the second node N2 and a gate connected to the first node N1. The second pull-up element PU2 and the second pull-down element PD2 may constitute a second inverter. As such, the first inverter and the second inverter may be cross-coupled with each other to constitute a latch.

The equalization unit 51 is connected between the gate of the first pull-down element PD1 and the gate of the second pull-down element PD2. When an equalization signal EQ is activated, the equalization unit 51 connects the gate of the first pull-down element PD1 with the gate of the second pull-down element PD2. For example, the equalization unit 51 may be an NMOS transistor that has a source connected to the gate of the first pull-down element PD1, a drain connected to the gate of the second pull-down element PD2, and a gate to which the equalization signal EQ is applied. In this case, when the equalization signal EQ is activated to '1', the equalization unit 51 is turned on to connect the gate of the first pull-down element PD1 to the gate of the second pull-down element PD2. Thus, a voltage level of the gate of the first pull-down element PD1 and a voltage level of the gate of the second pull-down element PD2 become about equal to each other.

The first non-volatile memory device NV1 is connected between a source of the first pull-down element PD1 and a ground voltage terminal VSS, and the second non-volatile memory device NV2 is connected between a source of the second pull-down element PD2 and the ground voltage terminal VSS. The first non-volatile memory device NV1 and the second non-volatile memory device NV2 may be programmed complementarily.

According to the example embodiments, the first and second non-volatile memory devices NV1 and NV2 may be resistive memory devices, magnetic memory devices, flash memory devices or the like. An operation of the switch NM according to a result of the programming of the first and second non-volatile memory devices NV1 and NV2 when the first and second non-volatile memory devices NV1 and NV2 are resistive memory devices will now be described in detail. However, the first and second non-volatile memory devices NV1 and NV2 are not limited to this example.

When the first non-volatile memory device NV1 is programmed to '1' and the second non-volatile memory device NV2 is programmed to '0', the first non-volatile memory device NV1 corresponds to a low resistance state, and the second non-volatile memory device NV2 corresponds to a high resistance state. When the equalization signal EQ is activated to '1', the equalization unit 51 is turned on, and the first non-volatile memory device NV1 from among the first and second non-volatile memory devices NV1 and NV2 both connected to the ground voltage terminal VSS has a relatively/sufficiently low resistance, and thus the first node N1 is connected to the ground voltage terminal VSS. Accordingly, the voltage level of the first node N1 is '0' and the voltage level of the second node N2 is '1'. Thus, the switch NM is turned on and the internal wire W1 is connected to the external wire W2.

When the first non-volatile memory device NV1 is programmed to '0' and the second non-volatile memory device NV2 is programmed to '1', the first non-volatile memory device NV1 corresponds to a high resistance state, and the second non-volatile memory device NV2 corresponds to a low resistance state. When the equalization signal EQ is activated to '1', the equalization unit 51 is turned on, and the second non-volatile memory device NV2 from among the first and second non-volatile memory devices NV1 and NV2 both connected to the ground voltage terminal VSS has a relatively/sufficiently low resistance, and thus the second node N2 is connected to the ground voltage terminal VSS. Accordingly, the voltage level of the second node N2 is '0', and thus the switch NM is turned off and the internal wire W1 is not connected to the external wire W2.

According to the example embodiments, the security control unit 12 may include the switch NM and the switch control unit 50 arranged at the intersection between the internal wire W1 and the external wire W2, and control connection between the internal wire W1 and the external wire W2 by complementarily programming the first and second non-volatile memory devices NV1 and NV2 included in the switch control unit 50. When the first and second non-volatile memory devices NV1 and NV2 are programmed so that the internal wire W1 is not connected to the external wire W2, the switch NM is turned off, and thus leakage current does not flow between the internal wire W1 and the external wire W2.

According to example embodiments, the switch control unit 50 may include a single non-volatile memory device and a single resistor instead of the first and second non-volatile memory devices NV1 and NV2. The single resistor may be selected to have a resistance between a resistance of the non-volatile memory device when the non-volatile memory device is in a high resistance state and that when the non-volatile memory device is in a low resistance state. In detail, the connection between the internal wire W1 and the external wire W2 may be controlled by a comparison between a resistance of the non-volatile memory device varying according to a result of programming of the non-volatile memory device and the resistance of the resistor.

In more detail, when the non-volatile memory device is programmed to '1', the non-volatile memory device corresponds to a low resistance, and the low resistance may be lower than the resistance of the resistor. Thus, a voltage level of the first node N1 is '0', and a voltage level of the second node N2 is '1'. Accordingly, the switch NM is turned on and the internal wire W1 may be connected to the external wire W2. On the other hand, when the non-volatile memory device is programmed to '0', the non-volatile memory device corresponds to a high resistance, and the high resistance may be higher than the resistance of the resistor. Thus, a voltage level of the second node N2 is '0', and accordingly, the switch NM is turned off and the internal wire W1 may not be connected to the external wire W2.

According to example embodiments, the circuit of FIG. 3 may include all switches implemented as in FIG. 4 or FIG. 5. Alternatively, the circuit of FIG. 3 may include some switches implemented as in FIG. 4 and the remainder implemented as in FIG. 5.

Figure 6:
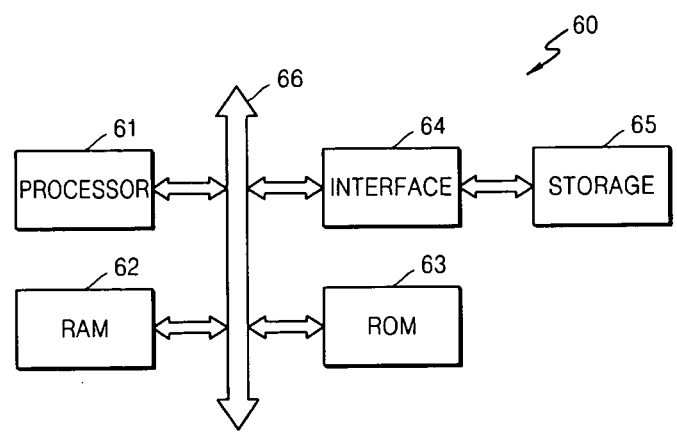
FIG. 6 is a schematic block diagram of an electronic device according to example embodiments.

FIG. 6 is a schematic block diagram of an electronic device 60 according to example embodiments.

Referring to FIG. 6, the electronic device 60 may include a processor 61, a volatile memory device (for example, RAM) 62, a non-volatile memory device (for example, ROM) 63, an interface 64, and a storage 65. The RAM 62, the ROM 63, or the storage 65 may be the storage device 10 according to example embodiments illustrated in FIGS. 1 through 5.

The processor 61 may control the electronic device 60 according to a control program. For example, the processor 61 may be a micro-processor. In this case, the processor 61 may access the RAM 62, the ROM 63, and the storage 65. The RAM 62 may store instructions and/or data used by the processor 61, for example, portions of an operating system (OS), a part (or all) of an application program, and/or data. The ROM 63 store programs, such as a basic input/output system (BIOS) required by the electronic device 60, and/or data. The storage 65 may be connected to a system bus 66 via the interface 64, may be used to store an OS, software, and/or data, and may include a hard disk drive, an optical disk drive, an SSD, or the like.

The processor 61, the RAM 62, the ROM 63, and the interface 64 may communicate with each other via the system bus 66. The system bus 66 may be any of several types of buses including a memory bus and/or a local bus using any of a memory controller, a peripheral bus, and various bus architectures. For example, these architectures may be an industry standard architecture (ISA) bus, a micro channel architecture (MCA) bus, an enhanced ISA (EISA) bus, a video electronics standard association (VESA) local bus, a peripheral component interconnect (PCI) bus, a front side bus (FSB), a Quick Path InterConnect (QPI), a HyperTransport (HT), and the like, but example embodiments are not limited thereto. The interface 64 may be a USB, an IEEE 1394, a personal computer memory card international association (PCMCIA), an ExpressCard, an e-SATA (serial ATA), a small computer system interface (SCSI), or the like.

Figure 7:
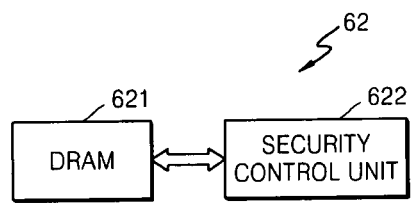
FIG. 7 is a block diagram of a random access memory (RAM) included in the electronic device illustrated in FIG. 6, according to example embodiments.

FIG. 7 is a block diagram of the RAM 62 included in the electronic device 60 illustrated in FIG. 6, according to example embodiments.

Referring to FIG. 7, the RAM 62 may include a DRAM 621 and/or a security control unit 622. The security control unit 622 may be somewhat similar to the security control unit 12 illustrated in FIG. 1, and thus a detailed description thereof will be omitted. As such, the security control unit 622 may secure (for example, encrypt) data stored in the DRAM 621. Although FIG. 7 illustrates the RAM 62 including the DRAM 621, example embodiments are not limited thereto, and the RAM 62 may include any other memory device.

Figure 8:
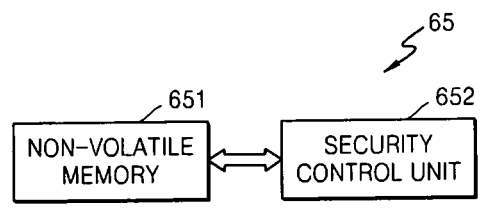
FIG. 8 is a block diagram of a storage device included in the electronic device illustrated in FIG. 6, according to example embodiments.

FIG. 8 is a block diagram of the storage 65 included in the electronic device 60 illustrated in FIG. 6, according to example embodiments.

Referring to FIG. 8, the storage 65 may include a non-volatile memory 651 and a security control unit 652. The security control unit 652 may be somewhat similar to the security control unit 12 illustrated in FIG. 1, and thus a detailed description thereof will be omitted. The non-volatile memory 651 may be any of various memory devices such as a flash memory device, an RRAM, an MRAM, a PRAM, an EEPROM, or the like.

Figure 9:
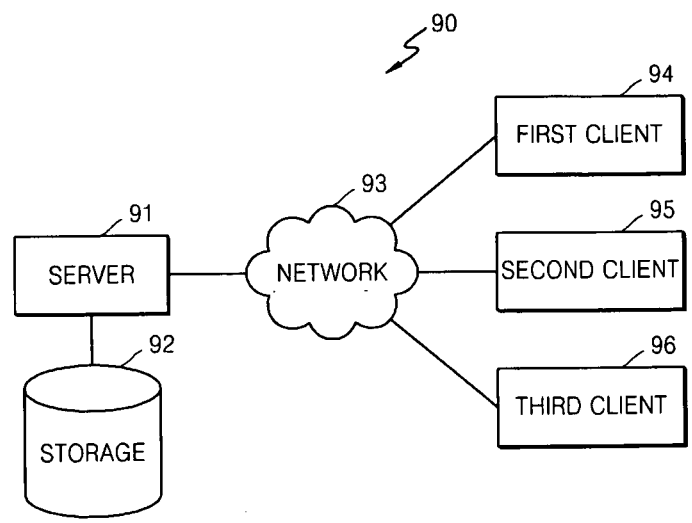
FIG. 9 is a block diagram of a server-client system according to example embodiments.

FIG. 9 is a schematic block diagram of a server-client system 90 according to example embodiments.

Referring to FIG. 9, the server-client system 90 may include a server 91 and a plurality of clients 94, 95, and 96 connected to the server 91 via a network 93. The server 91 may provide data received from a storage 92 to the clients 94, 95, and/or 96 via the network 93 and/or store data in the storage 92, in response to requests of the clients 94, 95, and/or 96. For example, the server 91 and/or the storage 92 may be storage servers. The storage 92 may be the storage device 10 illustrated in FIGS. 1 through 5, for example.

For example, the server 91 may be a service provider that provides, for example, a music file, and the clients 94, 95, and 96 may be users who have subscribed to the service. The storage 92 may, for example, include a music file A, a music file B, and/or a music file C in the form of secured data. The first client 94 may be a user who has been authorized to access the music file A, and the second and third clients 95 and 96 may be users who have not been authorized to access the music file A and have been authorized to access for the music files B and C. Thus, the first client 94 may access the storage 92 by using a legal (for example, provided by the service provider) encryption key and acquire original data of the music file A from the storage 92. However, the second and third clients 95 and 96 have no legal encryption keys for the music file A, or, in the alternative, although the second and third clients 95 and 96 have encryption keys, the encryption keys are not legal. Thus, even when the second and third clients 95 and 96 access the storage 92, they may not acquire the original data of the music file A.

Figure 10:
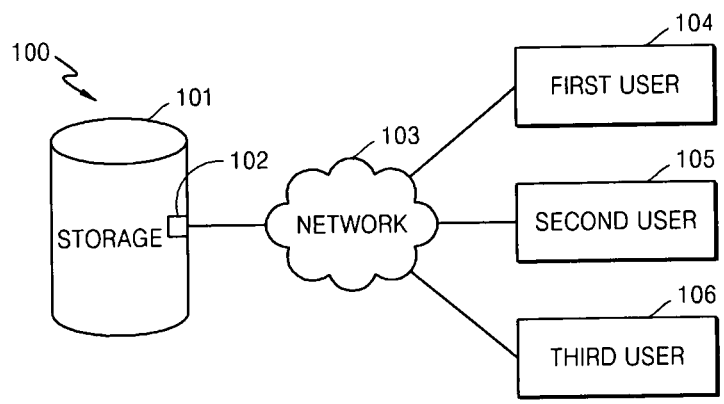
FIG. 10 is a block diagram of a network storage according to example embodiments.

FIG. 10 is a schematic block diagram of a network storage 100 according to example embodiments.

Referring to FIG. 10, the network storage 100 may include a storage 101 and a network interface 102 and may be connected to a network 103 via the network interface 102. A plurality of users 104, 105, and 106 may be connected to the network storage 100 via the network 103 in order to store data in the storage 101 and/or read data from the storage 101. The storage 101 may be the storage device 10 illustrated in FIGS. 1 through 5, for example. Each of the users 104, 105, and 106 may encrypt his or her files in real time by using an encryption key and may store the encrypted files, or may read their own encrypted files. Even when each of the users 104, 105, and 106 accesses files of the other users, each of the users 104, 105, and 106 may not acquire original data thereof because he or she does not have an encryption key or has an illegal encryption key.

Figure 11:
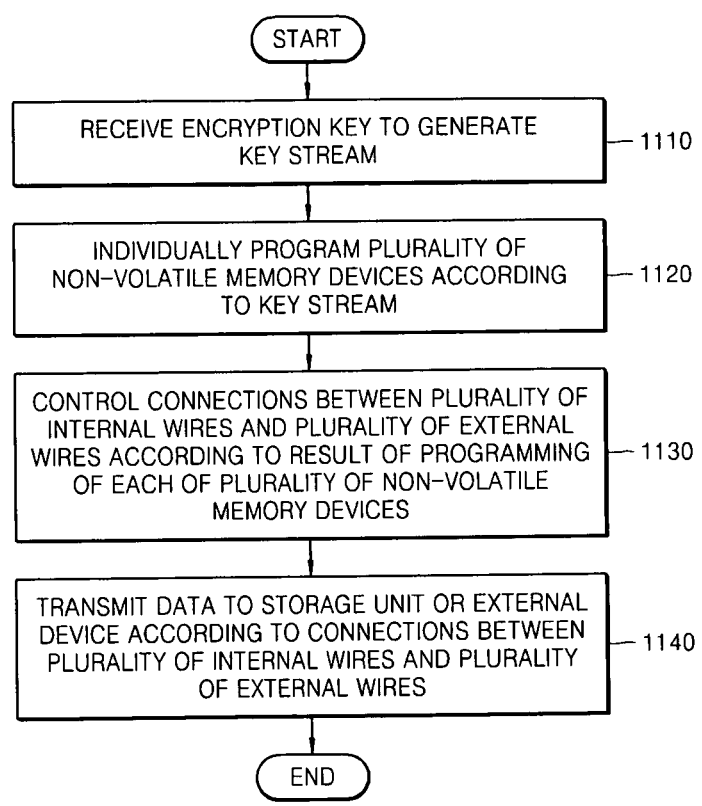
FIG. 11 is a flowchart of a method of securing a storage device, according to example embodiments.

FIG. 11 is a flowchart of a method of securing a storage device, according to example embodiments.

Referring to FIG. 11, the storage device securing method is a method of securing the storage device 10 illustrated in FIGS. 1 through 5. Accordingly, the contents described above with reference to FIGS. 1 through 5 may be equally applied to example embodiments.

In operation 1110, an encryption key is received to generate a key stream.

In operation 1120, a plurality of non-volatile memory devices are individually programmed according to the key stream.

In operation 1130, connections between a plurality of internal wires and a plurality of external wires are controlled according to a result of the programming of each of the plurality of non-volatile memory devices.

In operation 1140, data is transmitted to a storage unit and/or an external device according to the connections between the plurality of internal wires and the plurality of external wires.

According to example embodiments, if the encryption key is changed, the storage device securing method may further include an operation of programming each of the plurality of non-volatile memory devices according to the changed encryption key. In this case, in the operation 1130, the connection between each of a plurality of first wires and each of a plurality of second wires may be changed according to a result of the programming of each of the plurality of non-volatile memory devices.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A storage device comprising:
   a storage unit configured to store data transmitted via a plurality of first wires; and
   a security control unit having a plurality of switching devices, each of the switching devices including at least one non-volatile memory device, the security control unit being configured to control a connection between each of a plurality of second wires connected to an external device and each of the plurality of first wires by programming the plurality of switching devices according to an encryption key.

2. The storage device of claim 1, wherein the security control unit connects the plurality of first wires to the plurality of second wires in a one-to-one correspondence by controlling a routing between the plurality of first and second wires based on the programmed plurality of switching devices.

3. The storage device of claim 1, wherein the security control unit further includes:
   a key stream generation unit configured to receive the encryption key and generate a key stream; and
   a wiring connection control unit configured to program the plurality of switching devices according to the generated key stream so as to control the connection between each of the plurality of second wires and each of the plurality of first wires.

4. The storage device of claim 3, wherein the security control unit further includes a wiring connection unit, the wiring connection unit including:
   the plurality of first wires;
   the plurality of second wires; and
   the plurality of switching devices at intersections of the plurality of first wires and the plurality of second wires, the plurality of switching devices configured to connect each of the plurality of second wires and each of the plurality of first wires according to a result of the programming performed by the wiring connection control unit.

5. The storage device of claim 4, wherein the plurality of switching devices includes resistive memory devices or flash memory devices.

6. The storage device of claim 4, wherein the plurality of switching devices includes resistive memory devices, and
   a difference between a resistance of each of the resistive memory devices when programmed to a first logic state and a resistance of each of the resistive memory devices when programmed to a second logic state is greater than a desired resistance.

7. The storage device of claim 3, wherein the security control unit further includes a wiring connection unit, the wiring connection unit including:
the plurality of first wires;
the plurality of second wires; and
the plurality of switching devices that are at intersections of the plurality of first wires and the plurality of second wires, wherein each of the plurality of switching devices includes:
a switch; and
a switch control unit that includes the at least one non-volatile memory device that is programmed by the wiring connection control unit, and that controls the switch to be turned on/off.

8. The storage device of claim 7, wherein the switch control unit further includes a latch that reads and stores a logic value programmed in the at least one non-volatile memory device.

9. The storage device of claim 7, wherein the switch control unit further includes a latch that reads and stores a logic value programmed in at least two non-volatile memory devices that are complementarily programmed according to the encryption key.

10. The storage device of claim 9, wherein the latch comprises:
a first inverter including a first pull-up transistor connected to a power supply voltage terminal and a first pull-down transistor serially connected to the first pull-up transistor;
a second inverter including a second pull-up transistor connected to the power supply voltage terminal and a second pull-down transistor serially connected to the second pull-up transistor, the second inverter being cross-coupled with the first inverter; and
an equalization unit that connects a gate of the first pull-down transistor to a gate of the second pull-down transistor according to an equalization signal.

11. The storage device of claim 10, wherein the equalization unit comprises a transistor that is turned on when the equalization signal is activated, to connect a gate of the first pull-down transistor to a gate of the second pull-down transistor.

12. The storage device of claim 10, wherein the at least two non-volatile memory devices include:
a first non-volatile memory device connected between a source of the first pull-down transistor and a ground voltage terminal; and
a second non-volatile memory device connected between a source of the second pull-down transistor and the ground voltage terminal.

13. The storage device of claim 7, wherein the at least one non-volatile memory device comprises a resistive memory device, a magnetic memory device, or a flash memory device.

14. The storage device of claim 1, wherein the security control unit converts data input from the external device into secured data and provides the secured data to the storage unit, and converts the secured data stored in the storage unit to data which is provided to the external device, the conversion being performed by controlling the connection between each of the plurality of second wires and each of the plurality of first wires according to the encryption key.

15. The storage device of claim 1, wherein the security control unit decrypts encrypted data input from the external device and provides the decrypted data to the storage unit, and encrypts the decrypted data stored in the storage unit and provides the encrypted data to the external device, the encryption and decryption being performed by controlling the connection between each of the plurality of second wires and each of the plurality of first wires according to the encryption key.

16. The storage device of claim 1, wherein the plurality of first wires and the plurality of second wires are in a matrix shape.

17. An electronic device comprising:
the storage device of claim 1; and
a processor configured to access the storage device.

18. The electronic device of claim 17, wherein the storage device is at least one selected from the group consisting of a magnetic storage medium, an optical storage medium, a semiconductor storage medium and a combination thereof.

19. A storage server comprising:
the storage device of claim 1; and
a server configured to provide data from the storage device via a network or stores data to the storage device via the network, the data being provided and stored according to a client request.

20. A network storage comprising:
the storage device of claim 1; and
a network interface configured to connect the storage device to at least one user via a network.

21. A method of securing data stored in a storage device, the storage device including a storage unit configured to store data and a security control unit configured to secure the data, the method comprising:
programming a plurality of non-volatile memory devices included in the security control unit according to an encryption key of the storage device; and
controlling a connection between each of a plurality of first wires connected to the storage unit and each of a plurality of second wires connected to an external device, according to a result of the programming of each of the plurality of non-volatile memory devices.

22. The method of claim 21, further comprising receiving the encryption key to generate a key stream,
wherein programming the plurality of non-volatile memory devices includes performing a program operation on each of the plurality of non-volatile memory devices according to the generated key stream.

23. The method of claim 21, wherein controlling the connection between each of the plurality of second wires and each of the plurality of first wires includes connecting the plurality of first wires to the plurality of second wires in a one-to-one correspondence according to a result of the programming of each of the plurality of non-volatile memory devices.

24. The method of claim 21, wherein when the encryption key is modified, the method further comprises:
programming each of the plurality of non-volatile memory devices according to the modified encryption key,
wherein controlling the connection between each of the plurality of first wires and the plurality of second wires includes changing the connection between each of the plurality of second wires and each of the plurality of first wires according to a result of the programming of the plurality of non-volatile memory devices according to the modified encryption key.

25. The method of claim 21, further comprising transmitting the data to the storage unit or the external device according to the connection between each of the plurality of first wires and the plurality of second wires.

* * * * *